US008610987B2

(12) United States Patent
Nakamura et al.

(10) Patent No.: US 8,610,987 B2
(45) Date of Patent: Dec. 17, 2013

(54) OPTICAL DEVICE, OPTICAL SCANNER, AND IMAGE FORMING APPARATUS

(75) Inventors: Makiko Nakamura, Chino (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 606 days.

(21) Appl. No.: 12/695,333

(22) Filed: Jan. 28, 2010

(65) Prior Publication Data

US 2010/0238533 A1  Sep. 23, 2010

(30) Foreign Application Priority Data

Mar. 18, 2009  (JP) .................................. 2009-065726

(51) Int. Cl.
*G02B 26/08*  (2006.01)

(52) U.S. Cl.
USPC .................... 359/224.1; 359/199.3; 359/200.7

(58) Field of Classification Search
USPC ........................................... 359/196.1–226.2
See application file for complete search history.

(56) References Cited

U.S. PATENT DOCUMENTS

| 5,982,521 A | 11/1999 | Bessho et al. |
| 6,173,895 B1 * | 1/2001 | Plesko ..................... 235/462.33 |
| 6,956,684 B2 * | 10/2005 | Orcutt ........................ 359/199.1 |
| 7,457,023 B2 * | 11/2008 | Orcutt et al. ............... 359/224.1 |
| 8,059,324 B2 * | 11/2011 | Edmonds .................... 359/224.1 |
| 8,305,674 B2 | 11/2012 | Miyagawa et al. |
| 2002/0034024 A1 | 3/2002 | Orcutt et al. |

FOREIGN PATENT DOCUMENTS

| JP | 09-304721 | 11/1997 |
| JP | 2002-162583 A | 6/2002 |
| JP | 2007-272139 A | 10/2007 |
| JP | 2008-191513 | 8/2008 |
| JP | 2009-134243 A | 6/2009 |
| JP | 2009-175511 A | 8/2009 |
| JP | 2009-175513 A | 8/2009 |

* cited by examiner

*Primary Examiner* — James Phan
(74) *Attorney, Agent, or Firm* — Harness, Dickey & Pierce, P.L.C.

(57) ABSTRACT

An optical device includes: an axis member including a plate-shaped attachment portion and an elastic support portion that swingably supports the attachment portion around a predetermined axis; a rigid member attached to one side of the attachment portion; and a light reflecting member attached to the other side of the attachment portion and having an area larger than that of the attachment portion.

7 Claims, 7 Drawing Sheets

OPTICAL DEVICE, OPTICAL SCANNER, AND IMAGE FORMING APPARATUS

The entire disclosure of Japanese Patent Application No: 2009-065726, filed Mar. 18, 2009 is expressly incorporated by reference herein.

BACKGROUND

1. Technical Field

Some aspects according to the present invention relate to an optical device, an optical scanner, and an image forming apparatus produced, for example, by using a MEMS (Micro Electro Mechanical System) technology and having a movable plate moving around an elastic support portion in a reciprocating motion.

2. Related Art

An optical device of this type has been known as an optical scanner including a mirror/magnet assembly swingably supported by a shape-memory alloy wire, and the optical scanner is formed by separately preparing a mirror and a magnet and bonding and securing them with the shape-memory alloy wire interposed therebetween. The durability of the optical scanner can be enhanced because the above configuration improves the adhesion force between the mirror/magnet assembly and the shape-memory alloy wire (see JP-A-9-304721, for example).

The optical device of the related art, however, is problematic in that when the mirror/magnet assembly is in a swing motion, a force produced by torsional deformation of the axis member is transferred to the mirror/magnet assembly and huge local bending (distortion) is produced in the portion of the mirror/magnet assembly that is connected to the shape-memory alloy wire. To prevent the bending (distortion) of the mirror/magnet assembly, for example, increasing the thickness of the mirror/magnet assembly causes the following problem: When the oscillation system formed of the mirror/magnet assembly and the shape-memory alloy wire is oscillated (in a swing motion) at a fixed number of oscillation (frequency), the necessary length of the wire needs to be longer than that in an oscillation system with the thickness of the mirror/magnet assembly unchanged. As a result, the optical device becomes disadvantageously larger in size.

SUMMARY

An advantage of some aspects of the invention is to provide an optical device, an optical scanner, and an image forming apparatus capable of preventing the bending (distortion) of a light reflecting member and achieving size reduction.

An optical device according to a first aspect of the invention includes an axis member including a plate-shaped attachment portion and an elastic support portion that swingably supports the attachment portion around a predetermined axis, a rigid member attached to one side of the attachment portion, and a light reflecting member attached to the other side of the attachment portion and having an area larger than that of the attachment portion.

According to the configuration described above, since the rigid member is attached to the attachment portion, the rigidity of the attachment portion is enhanced. The enhanced rigidity can prevent the light reflecting member attached to the attachment portion from bending (distortion). Further, since the light reflecting member is attached to the attachment portion, the light reflecting member is not connected to the elastic support portion but connected to the axis member via the attachment portion. As a result, when the attachment portion swings around the predetermined axis, the rigid member reduces the force produced by torsional deformation of the elastic support portion, whereby bending (distortion) produced in related art in the portion of the light reflecting member that is connected to the elastic support portion can be reduced. Further, the area of the light reflecting member is larger than that of the attachment portion. Since the elastic support portion is connected to the attachment portion and the area of the attachment portion is smaller than that of the light reflecting member, the optical device has a structure in which the elastic support portion is located inside the end of the light reflecting member. The length of the axis member can therefore be shorter than that in an optical device of related art in which the elastic support portion is connected to the end of the light reflecting member, whereby the optical device can be reduced in size. When the optical device is manufactured, for example, from a silicon substrate, the size reduction allows the number of optical devices that can be manufactured from a material of a fixed area to be increased and hence the manufacturing cost of the optical device to be reduced. Moreover, since the rigid member is attached to one side of the attachment portion and the light reflecting member is attached to the other side of the attachment portion, the center of gravity of the oscillation system formed of the light reflecting member, the axis member, and the rigid member can be located on the central axis of the axis member. The configuration can prevent oscillation other than torsion when the attachment portion swings around the predetermined axis. Further, since the light reflected off the light reflecting member precisely follows a linear path, an image to be drawn will not be distorted and the optical device can be readily controlled.

It is preferred that the rigid member is a ferromagnet and the optical device further includes a magnetic field generation unit that generates a drive force between the ferromagnet and the magnetic field generation unit to swing the attachment portion.

According to the configuration described above, since the optical device includes the magnetic field generation unit that generates a drive force between the ferromagnet and the magnetic field generation unit to swing the attachment portion, a coil as the magnetic field generation unit and a power source that supplies AC current to the coil can, for example, be used to produce an electromagnetic force between the ferromagnet and the magnetic field generation unit and readily swing the attachment portion.

The ferromagnet is preferably a permanent magnet.

According to the configuration described above, since a permanent magnet is used as the rigid member, the rigidity of the attachment portion is enhanced, and a larger electromagnetic force can be produced between the permanent magnet and the magnetic field generation unit.

It is preferred that the optical device further includes an interposable member attached to the attachment portion and the light reflecting member is attached to the attachment portion via the interposable member.

According to the configuration described above, the light reflecting member is attached to the attachment portion via the interposable member. In this process, a space corresponding to the thickness of the interposable member is formed between the attachment portion and the light reflecting member. Setting the thickness of the interposable member at an appropriate value allows the optical device to have a structure in which the light reflecting member will not come into contact with a support member when the light reflecting member along with the attachment portion swings around the predetermined axis. As a result, even when the support member has a frame, the width of the support member can be reduced and hence the optical device can be further reduced in size.

It is preferred that the shape of the attachment portion is substantially the same as that of the interposable member.

According to the configuration described above, since the shape of the attachment portion is substantially the same as that of the interposable member, the interposable member, when attached to the attachment portion, can be readily aligned therewith.

The axis member and the light reflecting member are preferably formed as separate members.

According to the configuration described above, since the axis member and the light reflecting member are formed as separate members, the length, the width, the thickness, and other factors of each of the axis member and the light reflecting member, which are subjected to constraint when the axis member and the light reflecting member are formed integrally with each other, can be set at optimum values without any constraint to form the axis member and the light reflecting member. As a result, the optical device can be readily designed.

It is preferred that the optical device further includes a support member that supports the axis member and the axis member and the support member are formed integrally with each other.

According to the configuration described above, since the axis member and the support member are formed integrally with each other, the rigidity of the portion that connects the axis member to the support member is enhanced. As a result, when the attachment portion swings around the predetermined axis, possible breakage or failure of the portion that connects the axis member to the support member can be reduced.

An optical device according to a second aspect of the invention includes an axis member including a plate-shaped attachment portion and an elastic support portion that swingably supports the attachment portion around a predetermined axis, a rigid member attached to the attachment portion, and a light reflecting member attached to the attachment portion via the rigid member and having an area larger than that of the attachment portion.

According to the configuration described above, since the rigid member is attached to the attachment portion, the rigidity of the attachment portion is enhanced. The enhanced rigidity can prevent the light reflecting member attached to the attachment portion from bending (distortion). Further, since the light reflecting member is attached to the attachment portion, the light reflecting member is not connected to the elastic support portion but connected to the axis member via the attachment portion. As a result, when the attachment portion swings around the predetermined axis, the rigid member reduces the force produced by torsional deformation of the elastic support portion, whereby bending (distortion) produced in related art in the portion of the light reflecting member that is connected to the elastic support portion can be reduced. Further, the area of the light reflecting member is larger than that of the attachment portion. Since the elastic support portion is connected to the attachment portion and the area of the attachment portion is smaller than that of the light reflecting member, the optical device has a structure in which the elastic support portion is located inside the end of the light reflecting member. The length of the axis member can therefore be shorter than that in an optical device of related art in which the elastic support portion is connected to the end of the light reflecting member, whereby the optical device can be reduced in size. When the optical device is manufactured, for example, from a silicon substrate, the size reduction allows the number of optical devices that can be manufactured from a material of a fixed area to be increased and hence the manufacturing cost of the optical device to be reduced. Moreover, the light reflecting member is attached to the attachment portion via the rigid member. In this process, a space corresponding to the thickness of the rigid member is formed between the attachment portion and the light reflecting member. Setting the thickness of the rigid member at an appropriate value allows the optical device to have a structure in which the light reflecting member will not come into contact with a support member when the light reflecting member along with the attachment portion swings around the predetermined axis. As a result, even when the support member is provided, the width of the support member can be reduced and hence the optical device can be further reduced in size.

It is preferred that the rigid member is a ferromagnet and the optical device further includes a magnetic field generation unit that generates a drive force between the ferromagnet and the magnetic field generation unit to swing the attachment portion.

According to the configuration described above, since the optical device includes the magnetic field generation unit that generates a drive force between the ferromagnet and the magnetic field generation unit to swing the attachment portion, a coil as the magnetic field generation unit and a power source that supplies AC current to the coil can, for example, be used to produce an electromagnetic force between the ferromagnet and the magnetic field generation unit and readily swing the attachment portion.

The ferromagnet is preferably a permanent magnet.

According to the configuration described above, since a permanent magnet is used as the rigid member, the rigidity of the attachment portion is enhanced, and a larger electromagnetic force can be produced between the permanent magnet and the magnetic field generation unit.

It is preferred that the light reflecting member has a recess and the rigid member fits into the recess.

According to the configuration described above, since the rigid member fits into the recess in the light reflecting member, the light reflecting member is readily aligned with the rigid member.

It is preferred that the shape of the attachment portion is substantially the same as that of the rigid member.

According to the configuration described above, since the shape of the attachment portion is substantially the same as that of the rigid member, the rigid member, when attached to the attachment portion, can be readily aligned therewith.

The axis member and the light reflecting member are preferably formed as separate members.

According to the configuration described above, since the axis member and the light reflecting member are formed as separate members, the length, the width, the thickness, and other factors of each of the axis member and the light reflecting member, which are subjected to constraint when the axis member and the light reflecting member are formed integrally with each other, can be set at optimum values without any constraint to form the axis member and the light reflecting member. As a result, the optical device can be readily designed.

It is preferred that the optical device further includes a support member that supports the axis member and the axis member and the support member are formed integrally with each other.

According to the configuration described above, since the axis member and the support member are formed integrally with each other, the rigidity of the portion that connects the axis member to the support member is enhanced. As a result, when the attachment portion swings around the predetermined axis, possible breakage or failure of the portion that connects the axis member to the support member can be reduced.

An optical scanner according to a third aspect of the invention includes the optical device according to the first or second aspect of the invention described above.

According to the configuration described above, since the optical scanner includes the optical device according to the first or second aspect of the invention described above, bending (distortion) produced in the light reflecting member can be reduced. As a result, the number of oscillation (frequency) of the oscillation system formed of the light reflecting member and the axis member can be further increased, and the angle at which the light reflecting member swings around the predetermined axis can be further increased. An optical scanner with a wide scan range can thus be provided.

An image forming apparatus according to a fourth aspect of the invention includes the optical scanner according to the third aspect of the invention described above.

According to the configuration described above, since the image forming apparatus includes the optical scanner according to the third aspect of the invention described above, the number of oscillation (frequency) of the oscillation system can be further increased, and the angle at which the light reflecting member swings around the predetermined axis can be further increased. As a result, the image forming apparatus can form a high-resolution image and have excellent drawing performance.

BRIEF DESCRIPTION OF THE DRAWINGS

The invention will now be described with reference to the accompanying drawings, wherein like numbers refer to like elements.

DESCRIPTION OF EXEMPLARY EMBODIMENTS

Figure 1:
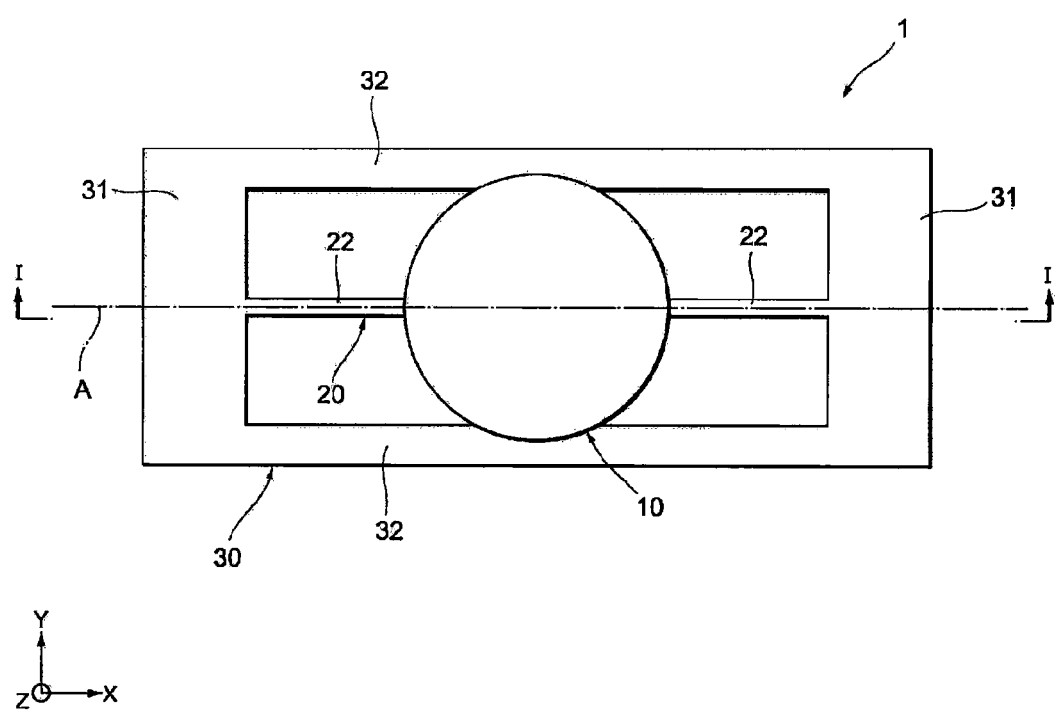
FIG. 1 is a plan view describing the configuration of an optical device according to a first embodiment of the invention.

Embodiments of the invention will be described below with reference to the drawings.
Optical Device
First Embodiment FIGS. 1 to 4 show an optical device according to a first embodiment of the invention. FIG. 1 is a plan view describing the configuration of the optical device according to the first embodiment of the invention. In the following description, the dimensions in the X-axis, Y-axis, and Z-axis directions are called "length," "width," and "thickness," respectively, unless otherwise particularly specified.

As shown in FIG. 1, an optical device 1 includes a light reflecting member 10, an axis member 20, and a support member 30. The light reflecting member 10 and the axis member 20 are formed as separate members, and the light reflecting member 10 is attached to the axis member 20. The axis member 20 and the support member 30 are preferably integrated in such a way that they are substantially flush with each other.

Figure 2:
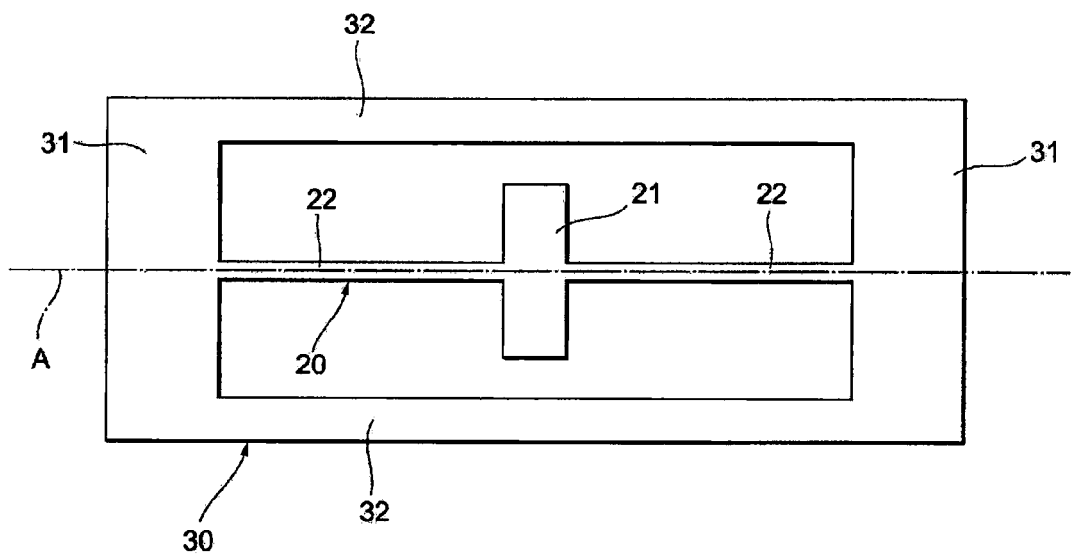
FIG. 2 is a plan view describing an axis member and a support member shown in FIG. 1.

FIG. 2 is a plan view describing the axis member and the support member shown in FIG. 1. As shown in FIG. 2, the axis member 20 includes a plate-shaped attachment portion 21 disposed in a substantially central portion and a pair of elastic support portions 22 that swingably support the attachment portion 21 relative to the support member 30 around an axis A, which is the central axis of the axis member 20.

The support member 30, which supports the axis member 20, is connected to the pair of elastic support portions 22. The support member 30 includes securing portions 31 that secure both ends of the axis member 20 and frames 32 that connect the securing portions 31 and 31. While the support member 30 includes the securing portions 31 and the frames 32 in the present embodiment, the configuration of the support member 30 is not limited to the above configuration. Alternatively, the support member 30 may not include the frames 32 but only the securing portions 31.

The attachment portion 21 and the elastic support portions 22 of the axis member 20 can be formed integrally with each other by etching, for example, a silicon substrate. To integrally form the axis member 20 and the support member 30 as well, they can be formed by etching a silicon substrate.

Figure 3A:
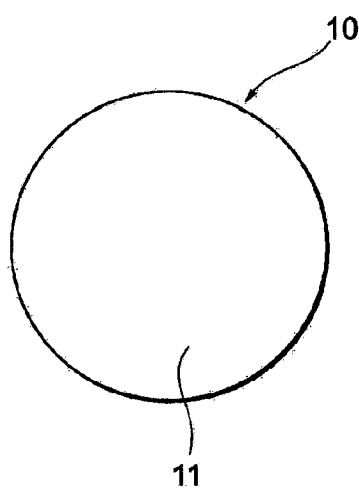
FIGS. 3A and 3B are front and rear views describing a light reflecting member shown in FIG. 1.
Figure 3B:
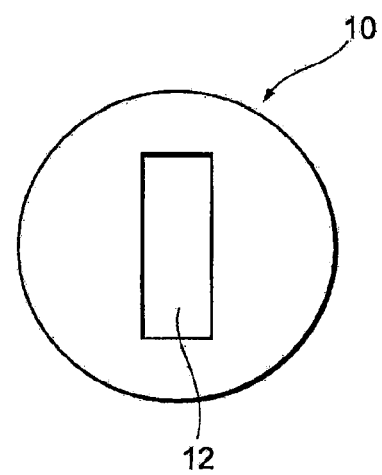

FIGS. 3A and 3B are a front view (FIG. 3A) and a rear view (FIG. 3B) describing the light reflecting member shown in FIG. 1. As shown in FIG. 3A, a metal film 11 that reflects incident light is formed on one side (hereinafter referred to as a front side) of the light reflecting member 10. The metal film 11 can be formed by carrying out vacuum deposition, sputtering, metal foil bonding, or any other suitable film forming method on, for example, a silicon substrate etched into a predetermined shape. Further, a recess 12 is formed in a substantially central portion on the other side (hereinafter referred to as a rear side) of the light reflecting member 10, as shown in FIG. 3B. The recess 12 is formed, for example, by etching the silicon substrate.

While the shape of the light reflecting member 10 when viewed from the above is circular in the present embodiment, the shape is not limited to circular but may be elliptical, rectangular, polygonal, or any other suitable shape as long as it performs the function that the light reflecting member 10 of the optical device 1 is required to perform.

Figure 4:
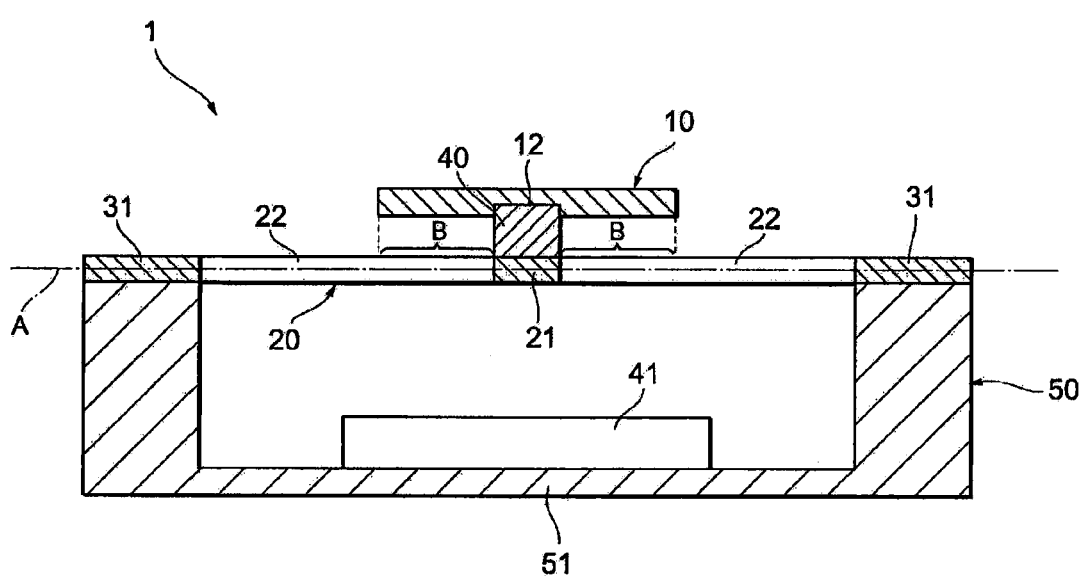
FIG. 4 is a cross-sectional view of the optical device taken along the line I-I shown in FIG. 1.

FIG. 4 is a cross-sectional view of the optical device 1 taken along the line I-I shown in FIG. 1. The line I-I shown in FIG. 1 is drawn along a line shifted from the axis A by a predetermined distance. As shown in FIG. 4, a magnet 40 is bonded to one side of the attachment portion 21 (the upper side in FIG. 4) with an adhesive (not shown). Since the magnet 40, which is highly rigid, is attached to the attachment portion 21 as described above, the rigidity of the attachment portion 21 is enhanced. The magnet 40 is preferably a permanent magnet.

An upper portion of the magnet 40 fits into the recess 12 in the light reflecting member 10 and is bonded to the light reflecting member 10 with an adhesive (not shown). The light reflecting member 10 is thus attached to the attachment portion 21 via the magnet 40. In this process, a space corresponding to the thickness of the magnet 40 is formed between the attachment portion 21 and the light reflecting member 10.

Setting the thickness of the magnet 40 at an appropriate value therefore allows the optical device 1 to have a structure in which the light reflecting member 10 will not come into contact with the frames 32 when the light reflecting member 10 along with the attachment portion 21 swings around the axis A. For example, when the light reflecting member 10 is 2 mm in diameter and 200 µm in thickness and the support member 30 is 200 µm in thickness, setting the thickness of the magnet 40 at 400 µm prevents the light reflecting member 10 from coming into contact with the frames 32 even when the light reflecting member 10 swings around the axis A at a deflection angle of 40 degrees.

The shape of the recess 12 is preferably formed into a shape that is substantially the same as that of the magnet 40 in the plan view. The shape of the attachment portion 21 is also preferably formed into a shape that is substantially the same as that of the magnet 40 in the plan view.

When the optical device 1 is viewed from the above as shown in FIG. 1, the area of the light reflecting member 10 is larger than both the areas of the attachment portion 21 and the magnet 40 so that the light reflecting member 10 covers the attachment portion 21 and the magnet 40, which is attached to the upper side of the attachment portion 21. Since the elastic support portions 22 are connected to the attachment portion 21 and the area of the attachment portion 21 is smaller than that of the light reflecting member 10, the optical device 1 has a structure in which only portions B of the elastic support portions 22 are located inside the end of the light reflecting member 10, as shown in FIG. 4.

In a plan view of the optical device 1, the magnet 40 is magnetized in the direction perpendicular to the axis A (the Y-axis direction in FIG. 1). That is, the magnet 40 has a pair of magnetic poles having different polarities on opposite sides of the axis A. While the magnet 40 has been described as a member separate from the light reflecting member 10 and the axis member 20 in the present embodiment, the magnet 40 is not necessarily configured as described above. The magnet 40 may alternatively be formed integrally with the light reflecting member 10 or the axis member 20. In this case, the magnet 40 is formed on the light reflecting member 10 or the attachment portion 21 by carrying out sputtering or any other suitable film forming method.

As shown in FIG. 4, the support member 30 is bonded to a holder 50 via an adhesive (not shown), and a coil 41 for swinging the attachment portion 21 is disposed on an inner bottom surface 51 of the holder 50. The coil 41 corresponds to a driver in the invention. A power source (not shown) supplies AC current alternating at a predetermined frequency to the coil 41. The coil 41 then produces a magnetic field oriented upward (toward the light reflecting member 10) and a magnetic field oriented downward in an alternating manner. The alternating magnetic field causes one of the pair of magnetic poles of the magnet 40 approaches the coil 41, whereas the other magnetic pole moves away therefrom. As a result, the elastic support portions 22 are torsionally deformed, and the attachment portion 21, the light reflecting member 10 attached to the attachment portion 21, and the magnet 40 swing around the axis A accordingly.

The predetermined frequency of the AC current supplied to the coil 41 is preferably set to substantially coincide with the number of oscillation (torsional resonance frequency) of the oscillation system formed of the light reflecting member 10, the axis member 20, and the magnet 40. Using the resonance as described above allows the deflection angle of the attachment portion 21 that swings around the axis A to be increased at low power consumption.

While a drive method using the electromagnetic force between the magnet 40 and the coil 41 has been presented in the present embodiment, the drive method does not necessarily use an electromagnetic force. Alternatively, any drive force may be produced between the magnet 40 and the coil 41/power source assembly, the magnet 40 corresponding to the ferromagnet and the coil 41 corresponding to the magnetic field generation unit in the invention. Still alternatively, when a rigid member in place of the magnet 40 is attached to the attachment portion 21, a method using electrostatic attraction or a drive method using a piezoelectric element as the driver may be employed to drive the optical device 1. For example, when a method using electrostatic attraction is employed, the magnet 40 is not necessary, and the coil 41 is replaced with one or more electrodes, which are disposed on the inner bottom surface 51 of the holder 50 in such a way that the electrodes face the attachment portion 21. An AC voltage alternating at a predetermined frequency is then applied between the attachment portion 21 and the electrodes to produce electrostatic attraction between the attachment portion 21 and the electrodes. As a result, the elastic support portions 22 torsionally deform, and the attachment portion 21 and the light reflecting member 10/magnet 40 assembly attached to the attachment portion 21 swing around the axis A.

As described above, according to the optical device 1 in the present embodiment, since the magnet 40 is attached to the attachment portion 21, the rigidity of the attachment portion is enhanced. The enhanced rigidity can prevent the light reflecting member 10 attached to the attachment portion from bending (distortion). Further, since the light reflecting member 10 is attached to the attachment portion 21, the light reflecting member 10 is not connected to the elastic support portions 22 but connected to the axis member 20 via the attachment portion 21. As a result, when the attachment portion 21 swings around the axis A, the magnet 40 reduces the force produced by the torsional deformation of the elastic support portions 22, whereby the bending (distortion) produced in related art in the portion of the light reflecting member that is connected to the elastic support portions can be reduced. Further, the area of the light reflecting member 10 is larger than that of the attachment portion 21. Since the elastic support portions 22 are connected to the attachment portion 21 and the area of the attachment portion 21 is smaller than that of the light reflecting member 10, the optical device 1 has a structure in which only the portions B of the elastic support portions 22 are located inside the end of the light reflecting member 10. The length of the axis member 20 can therefore be shorter than that in an optical device of related art in which the elastic support portions are connected to the end of the light reflecting member, whereby the optical device 1 can be reduced in size. When the optical device 1 is manufactured, for example, from a silicon substrate, the size reduction allows the number of optical devices 1 that can be manufactured from a material of a fixed area to be increased and hence the manufacturing cost of the optical device 1 to be reduced. Moreover, the light reflecting member 10 is attached to the attachment portion 21 via the magnet 40. In this process, a space corresponding to the thickness of the magnet 40 is formed between the attachment portion 21 and the light reflecting member 10. Setting the thickness of the magnet 40 at an appropriate value therefore allows the optical device 1 to have a structure in which the light reflecting member 10 will not come into contact with the support member 30 when the light reflecting member 10 along with the attachment portion 21 swings around a predetermined axis. As a result, even when the support member 30 is provided, the width of the support member 30 can be reduced and hence the optical device 1 can be further reduced in size.

Since the optical device 1 in the present embodiment includes the magnetic field generation unit that generates a drive force between the magnet 40 and the magnetic field generation unit to swing the attachment portion 21, the coil 41 as the magnetic field generation unit and the power source that supplies AC current to the coil can, for example, be used to produce an electromagnetic force between the magnet 40 and the magnetic field generation unit and readily swing the attachment portion 21.

Since the optical device 1 in the present embodiment uses a permanent magnet as the magnet 40, the rigidity of the attachment portion 21 is enhanced, and a larger electromagnetic force can be produced between the magnet 40 and the coil 41/power source assembly.

According to the optical device 1 in the present embodiment, since the magnet 40 fits into the recess 12 in the light reflecting member 10, the light reflecting member 10 can be readily aligned with the magnet 40.

According to the optical device 1 in the present embodiment, since the shape of the attachment portion 21 is substantially the same as that of the magnet 40, the magnet 40, when attached to the attachment portion 21, can be readily aligned therewith.

According to the optical device 1 in the present embodiment, since the axis member 20 and the light reflecting member 10 are formed as separate members, the length, the width, the thickness, and other factors of each of the axis member 20 and the light reflecting member 10, which are subjected to constraint when the axis member 20 and the light reflecting member 10 are formed integrally with each other, can be set at optimum values without any constraint to form the axis member 20 and the light reflecting member 10. As a result, the optical device 1 can be readily designed.

According to the optical device 1 in the present embodiment, since the axis member 20 and the support member 30 are formed integrally with each other, the rigidity of the portion that connects the axis member 20 to the support member 30 is enhanced. As a result, when the attachment portion 21 swings around the axis A, possible breakage or failure of the portion that connects the axis member 20 to the support member 30 can be reduced.

Second Embodiment

Figure 5A:
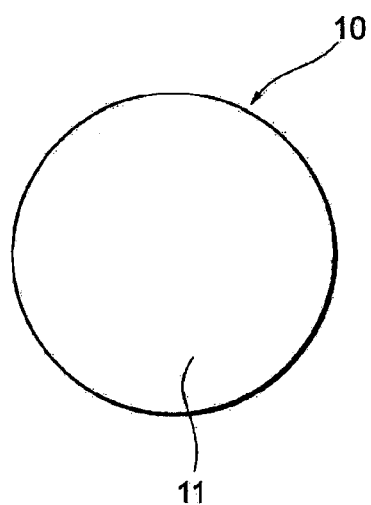
FIGS. 5A and 5B are front and rear views describing the light reflecting member of an optical device according to a second embodiment of the invention.
Figure 5B:
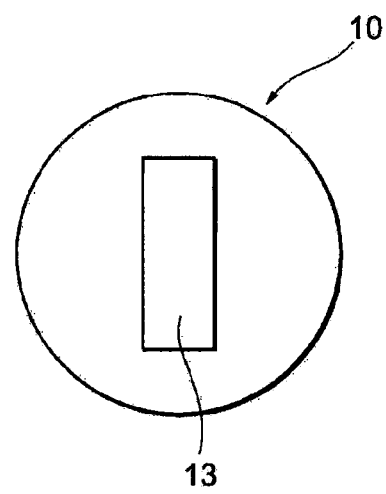
Figure 6:
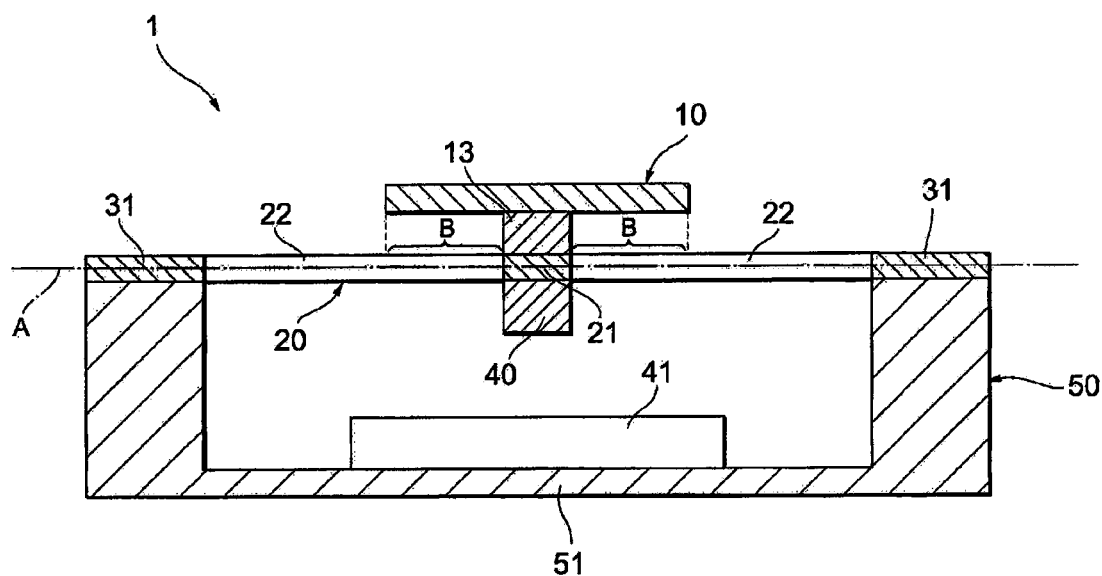
FIG. 6 is a side cross-sectional view describing the configuration of the optical device according to the second embodiment of the invention.

FIGS. 5A, 5B, and 6 show an optical device according to a second embodiment of the invention. FIGS. 5A and 5B are front and rear views describing the light reflecting member of the optical device according to the second embodiment of the invention. The components that are the same as those in the first embodiment described above have the same reference characters, and no description of the same components will be made.

As shown in FIG. 5A, the metal film 11 that reflects incident light is formed on the front side of the light reflecting member 10, as in the first embodiment. As shown in FIG. 5B, an interposable member 13 is provided in a substantially central portion of the rear side of the light reflecting member 10. The interposable member 13 may be formed integrally with the light reflecting member 10, for example, by etching a silicon substrate, or may be formed as a member separate from the light reflecting member 10 and bonded to the rear side of the light reflecting member 10 with an adhesive or any other suitable component. The shape of the interposable member 13 is preferably formed into a shape that is substantially the same as that of the attachment portion 21 in a plan view.

FIG. 6 is a side cross-sectional view describing the configuration of the optical device according to the second embodiment of the invention. FIG. 6 corresponds to FIG. 4 in the first embodiment. As shown in FIG. 6, the magnet 40 is bonded to one side of the attachment portion 21 (the lower side in FIG. 6) with an adhesive (not shown). The interposable member 13 is bonded to the other side of the attachment portion 21 (the upper side in FIG. 6) with an adhesive (not shown). The light reflecting member 10 is thus attached to the attachment portion 21 via the interposable member 13. In this process, a space corresponding to the thickness of the interposable member 13 is formed between the attachment portion 21 and the light reflecting member 10. Setting the thickness of the interposable member 13 at an appropriate value therefore allows the optical device 1 to have a structure in which the light reflecting member 10 will not come into contact with the frames 32 when the light reflecting member 10 along with the attachment portion 21 swings around the axis A.

While the light reflecting member 10 is attached to the attachment portion 21 via the interposable member 13 in the present embodiment, the above configuration is not necessarily employed. Alternatively, the light reflecting member 10 may be directly attached to the other side of the attachment portion 21.

Since the magnet 40 is attached to one side of the attachment portion 21 (lower side in FIG. 6) and the light reflecting member 10 (and the interposable member 13) is attached to the other side of the attachment portion 21 (upper side in FIG. 6), the center of gravity of the oscillation system formed of the light reflecting member 10 (and the interposable member 13), the axis member 20, and the magnet 40 can be readily controlled. That is, setting as appropriate the size and the position of each of the light reflecting member 10 (and the interposable member 13), the axis member 20, and the magnet allows the position of the center of gravity of the oscillation system (the positions in the X-axis, Y-axis, and Z-axis directions shown in FIG. 1) to be located on the axis A.

As described above, according to the optical device 1 in the present embodiment, since the magnet 40 is attached to the attachment portion 21, the rigidity of the attachment portion is enhanced, as in the first embodiment. The enhanced rigidity can prevent the light reflecting member 10 attached to the attachment portion 21 from bending (distortion). Further, since the light reflecting member 10 is attached to the attachment portion 21, the light reflecting member 10 is not connected to the elastic support portions 22 but connected to the axis member 20 via the attachment portion 21. As a result, when the attachment portion 21 swings around the axis A, the magnet 40 reduces the force produced by the torsional deformation of the elastic support portions 22, whereby the bending (distortion) produced in related art in the portion of the light reflecting member that is connected to the elastic support portions can be reduced. Further, the area of the light reflecting member 10 is larger than that of the attachment portion 21. Since the elastic support portions 22 are connected to the attachment portion 21 and the area of the attachment portion 21 is smaller than that of the light reflecting member 10, the optical device 1 has a structure in which only the portions B of the elastic support portions 22 are located inside the end of the light reflecting member 10. The length of the axis member 20 can therefore be shorter than that in an optical device of related art in which the elastic support portions are connected to the end of the light reflecting member, whereby the optical device 1 can be reduced in size. When the optical device 1 is manufactured, for example, from a silicon substrate, the size reduction allows the number of optical devices 1 that can be manufactured from a material of a fixed area to be increased and hence the manufacturing cost of the optical device 1 to be reduced. Moreover, unlike the first embodiment, since the magnet 40 is attached to one side of the attachment portion 21 and the light reflecting member 10 is attached to the other side of the attachment portion 21, the center of gravity of the oscillation system formed of the light reflecting member 10, the axis member 20, and the magnet 40 can be located on the central axis, that is, the axis A. The configuration can prevent oscillation other than torsion when the attachment portion 21 swings around the axis A. Since the light reflected off the light reflecting member 10 precisely follows a linear path, an image to be drawn will not be distorted and the optical device 1 can be readily controlled.

Since the optical device 1 in the present embodiment includes the magnetic field generation unit that generates a drive force between the magnet 40 and the magnetic field generation unit to swing the attachment portion 21, the coil 41 as the magnetic field generation unit and the power source that supplies AC current to the coil can, for example, be used to produce an electromagnetic force between the magnet 40 and the magnetic field generation unit and readily swing the attachment portion 21, as in the first embodiment.

Since the optical device 1 in the present embodiment uses a permanent magnet as the magnet 40, the rigidity of the attachment portion 21 is enhanced, and a larger electromagnetic force can be produced between the magnet 40 and the coil 41/power source assembly, as in the first embodiment.

According to the optical device 1 in the present embodiment, the light reflecting member 10 is attached to the attachment portion 21 via the interposable member 13. In this process, a space corresponding to the thickness of the interposable member 13 is formed between the attachment portion 21 and the light reflecting member 10. Setting the thickness of the interposable member 13 at an appropriate value therefore allows the optical device 1 to have structure in which the light reflecting member 10 will not come into contact with the support member 30 when the light reflecting member 10 along with the attachment portion 21 swings around the axis A. As a result, even when the support member 30 is provided, the width of the support member 30 can be reduced and hence the optical device 1 can further be reduced in size.

According to the optical device 1 in the present embodiment, since the shape of the attachment portion 21 is substantially the same as that of the interposable member 13, the interposable member 13, when attached to the attachment portion 21, can be readily aligned therewith.

According to the optical device 1 in the present embodiment, since the axis member 20 and the light reflecting member 10 are formed as separate members, the length, the width, the thickness, and other factors of each of the axis member 20 and the light reflecting member 10, which are subjected to constraint when the axis member 20 and the light reflecting member 10 are formed integrally with each other, can be set at optimum values without any constraint to form the axis member and the light reflecting member 10, as in the first embodiment. As a result, the optical device 1 can be readily designed.

According to the optical device 1 in the present embodiment, since the axis member 20 and the support member 30 are formed integrally with each other, the rigidity of the portion that connects the axis member 20 to the support member 30 is enhanced, as in the first embodiment. As a result, when the attachment portion 21 swings around the axis A, possible breakage or failure of the portion that connects the axis member 20 to the support member 30 can be reduced.

Optical Scanner

Since the optical device 1 described above includes the light reflecting member 10, the optical device 1 can be suitably used as an optical scanner provided in a laser printer, a barcode reader, a confocal laser scanning microscope, an imaging display, and other image forming apparatus. The optical scanner according to an embodiment of the invention has the same configuration as that of the optical device 1 described above, and no description of the optical scanner will be made.

Since the optical scanner according to an embodiment of the invention includes the optical device 1 according to any of the embodiments described above, bending (distortion) produced in the light reflecting member 10 can be reduced, and the optical scanner can be reduced in size. As a result, the number of oscillation (frequency) of the oscillation system formed of the light reflecting member 10 and the axis member 20 can be further increased, and the deflection angle at which the light reflecting member 10 swings around the axis A can be further increased. An optical scanner with a wide scan range can thus be provided.

Image Forming Apparatus

Figure 7:
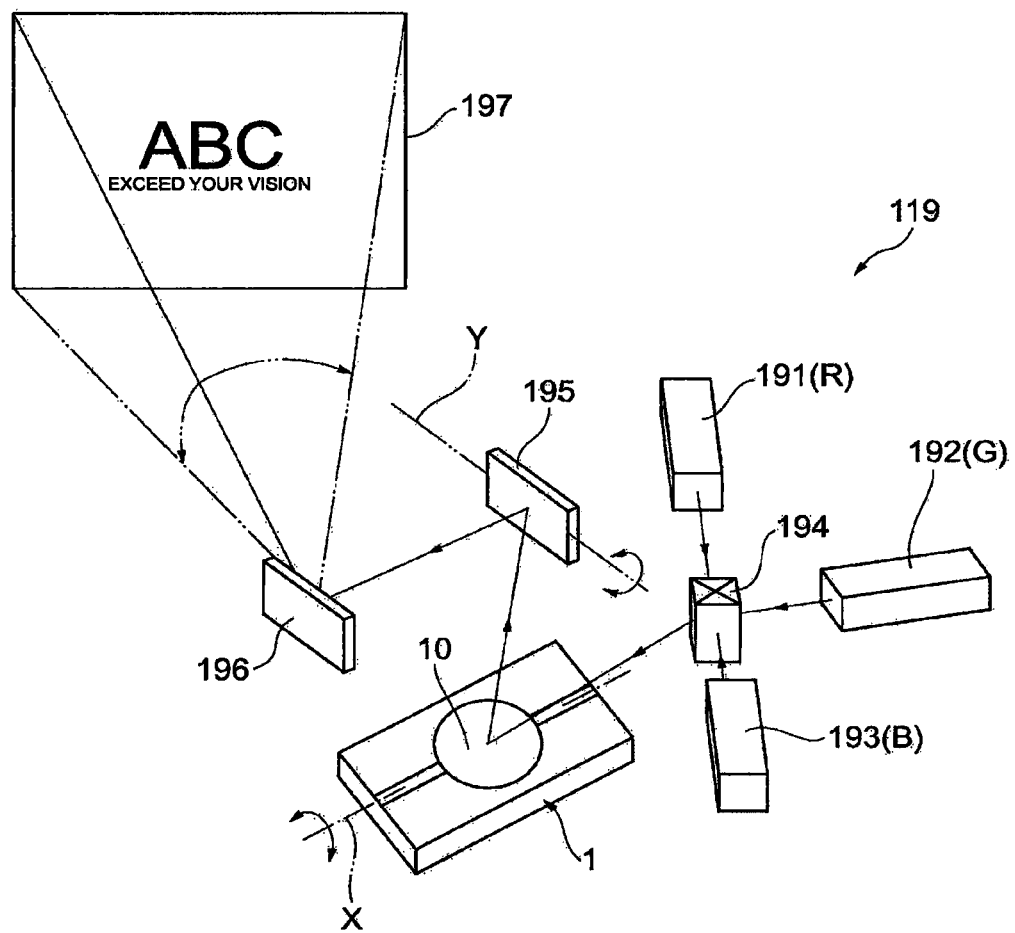
FIG. 7 is a schematic view describing an exemplary image forming apparatus including an optical scanner according to an embodiment of the invention.

An image forming apparatus according to an embodiment of the invention will be described with reference to FIG. 7. FIG. 7 is a schematic view describing an exemplary image forming apparatus including the optical scanner according to an embodiment of the invention.

An image forming apparatus (imaging display) 119 shown in FIG. 7 includes the optical device 1, which is the optical scanner according to an embodiment of the invention, light sources 191, 192, and 193 that emit R (red), G (green), and B (blue) three color light beams, respectively, a cross dichroic prism (X prism) 194, a galvanometric mirror 195, a fixed mirror 196, and a screen 197.

In the image forming apparatus 119, the light sources 191, 192, and 193 emit the color light beams toward (the light reflecting member 10 of) the optical device 1 via the cross dichroic prism 194. The red light from the light source 191, the green light from the light source 192, and the blue light from the light source 193 are combined in the cross dichroic prism 194. The light reflected off the light reflecting member (combined three-color light) is reflected off the galvanometric mirror 195, is reflected off the fixed mirror 196, and impinges on the screen 197.

In this process, the action of the optical device 1 (the swing motion of the attachment portion 21 around an axial line X) causes the light reflected off the light reflecting member 10 to be scanned in the horizontal direction of the screen 197 (primary scan). On the other hand, the pivotal motion of the galvanometric mirror 195 around an axial line Y causes the light reflected off the light reflecting member 10 to be scanned in the vertical direction of the screen 197 (secondary scan). The intensities of the light beams outputted from the color light sources 191, 192, and 193 change in accordance with image information received from a host computer (not shown).

As described above, since the image forming apparatus 119 according to an embodiment of the invention includes the optical scanner according to the embodiment of the invention described above, the number of oscillation (frequency) of the oscillation system formed of the light reflecting member 10 and the axis member 20 can be further increased, and the deflection angle at which the light reflecting member 10 swings around the axial line X can be further increased. As a result, the image forming apparatus 119 can form a high-resolution image and have excellent drawing performance.

It is noted that the configuration of any of the embodiments described above may be combined with any of the other configurations or part of the configuration of any of the embodiments described above may be replaced with part of any of the other configurations. Further, the configuration of the invention is not limited to those of the embodiments described above, but a variety of changes may be made to the extent that they do not depart from the spirit of the invention.

What is claimed is:

1. An optical device comprising:
   an axis member including a plate-shaped attachment portion and two elastic support portions that support the attachment portion around a swing axis, the two elastic support portions being on the swing axis;
   a support structure integral with the elastic support portions that frames the elastic support portions and the attachment portion;
   a rigid member attached to one side of the attachment portion;
   a light reflecting member attached to the other side of the attachment portion and having an area larger than that of the attachment portion; and
   an interposable member positioned between the light reflecting member and the attachment portion,
   wherein the light reflecting member, when viewed in plan, overlaps the support structure that frames the elastic support portions and the attachment portion.

2. The optical device according to claim 1, wherein the shape of the attachment portion is substantially the same as that of the interposable member.

3. An optical scanner comprising the optical device according to claim 1.

4. An image forming apparatus comprising the optical scanner according to claim 3.

5. The optical device according to claim 1, wherein the rigid member is a ferromagnet, and the optical device further comprises a magnet field generation unit that generates a drive force between the ferromagnet and the magnetic field generation unit to swing the attachment portion.

6. The optical device according to claim 5, wherein the ferromagnet is a permanent magnet.

7. The optical device according to claim 1, wherein the attachment portion and the two elastic support portions are formed of the same material.

* * * * *